United States Patent
Chin et al.

(10) Patent No.: US 9,690,272 B2
(45) Date of Patent: Jun. 27, 2017

(54) INDOOR AUTOMATION AND CONTROL METHOD AND SYSTEM THEREOF USING RFID-TO-BLUETOOTH SELECTIVE ADAPTER

(71) Applicant: POLARIS TECH GLOBAL LIMITED, Victoria (SC)

(72) Inventors: Ting-Yueh Chin, Taichung (TW); Su-Teng Kuo, New Taipei (TW)

(73) Assignee: POLARIS TECH GLOBAL LIMITED, Apia (WS)

( * ) Notice: Subject to any disclaimer, the term of this patent is extended or adjusted under 35 U.S.C. 154(b) by 270 days.

(21) Appl. No.: 14/726,584

(22) Filed: May 31, 2015

(65) Prior Publication Data

US 2016/0239001 A1    Aug. 18, 2016

Related U.S. Application Data

(63) Continuation-in-part of application No. 14/623,464, filed on Feb. 16, 2015, now Pat. No. 9,087,246.

(51) Int. Cl.
*H04W 12/06* (2009.01)
*H04W 12/08* (2009.01)
(Continued)

(52) U.S. Cl.
CPC ............ *G05B 15/02* (2013.01); *F24F 11/006* (2013.01); *G07C 9/00* (2013.01); *H04L 12/2803* (2013.01); *H04W 4/008* (2013.01); *H04W 12/08* (2013.01); *H05B 37/02* (2013.01); *H04L 63/0892* (2013.01); *H04W 12/06* (2013.01)

(58) Field of Classification Search
CPC ..... H04W 4/008; H04W 12/06; H04W 12/08; G05B 15/02; G07C 9/003009; G06K 7/10297

See application file for complete search history.

(56) References Cited

U.S. PATENT DOCUMENTS

| | | | | |
|---|---|---|---|---|
| 8,674,832 | B1 * | 3/2014 | Thomas | E05B 45/06 292/346 |
| 9,087,246 | B1 * | 7/2015 | Chin | G06K 7/10297 |
| 9,378,597 | B2 * | 6/2016 | Shen | G07C 9/00087 |
| 9,619,954 | B2 * | 4/2017 | Allibhoy | G07C 9/00309 |
| 2007/0197261 | A1 * | 8/2007 | Humbel | G06Q 30/00 455/558 |

(Continued)

*Primary Examiner* — Ronald Hartman, Jr.
(74) *Attorney, Agent, or Firm* — Ding Yu Tan (57) ABSTRACT

Short-range and long-range operating methods for hospitality accommodation automation and control using APP, webpage, smartphone, RFID-to-Bluetooth selective adapter, relay controller together with RFID door lock is disclosed, where unlocking RFID door lock requires just pressing a button, various power outlets, lighting levels, HVAC settings, and tv settings can be controlled by smartphone. A gateway device with internet connectivity allows remote unlock or lock of doorlock, sending notifications of door unlock events back to a cloud server, and remotely control electrical or electronic devices under short-range or long-range modes. Detection methods for determining whether any occupant remains inside the room is also included. Current sensor is used for assess electric power consumption rate. Automation enhancements are provided for the hospitality industry to improve overall stay experience of the room unit by offering online services and offline services that can be implemented and activated upon unlocking or locking of smartlock.

12 Claims, 5 Drawing Sheets

(Short range and long-range indoor automation and control system) 50

(51) Int. Cl.
*G05B 15/02* (2006.01)
*H04W 4/00* (2009.01)
*H04L 12/28* (2006.01)
*F24F 11/00* (2006.01)
*H05B 37/02* (2006.01)
*G07C 9/00* (2006.01)
*H04L 29/06* (2006.01)

(56) References Cited

U.S. PATENT DOCUMENTS

| | | | |
|---|---|---|---|
| 2008/0246604 A1* | 10/2008 | McPherson | G06Q 10/08 340/539.27 |
| 2011/0252843 A1* | 10/2011 | Sumcad | E05B 47/00 70/91 |
| 2013/0241694 A1* | 9/2013 | Sharma | G08C 17/02 340/5.64 |
| 2014/0120905 A1* | 5/2014 | Kim | G07C 9/00857 455/426.1 |
| 2015/0356801 A1* | 12/2015 | Nitu | G07C 9/00166 340/5.61 |
| 2016/0042582 A1* | 2/2016 | Hyde | G07C 9/00944 70/53 |
| 2016/0093130 A1* | 3/2016 | Shen | G07C 9/00015 340/5.61 |
| 2016/0232728 A1* | 8/2016 | Allibhoy | G07C 9/00309 |
| 2016/0241999 A1* | 8/2016 | Chin | H04W 4/021 |
| 2016/0253855 A1* | 9/2016 | Lowder | H04M 1/72533 455/420 |
| 2016/0316497 A1* | 10/2016 | Dyk | G07C 9/00571 |
| 2016/0371907 A1* | 12/2016 | Ma | E05B 81/80 |

* cited by examiner

INDOOR AUTOMATION AND CONTROL METHOD AND SYSTEM THEREOF USING RFID-TO-BLUETOOTH SELECTIVE ADAPTER

CROSS-REFERENCE TO RELATED APPLICATIONS

This application is a continuation-in-part application of prior application Ser. No. 14/623,464, filed on Feb. 16, 2015, now pending, the patent application identified above is incorporated here by reference in its entirety to provide continuity of disclosure.

FIELD OF THE INVENTION

The present invention generally relates to an indoor automation and control system and method thereof using a RFID-to-Bluetooth adapter device and, more particularly, to automation and control method of various indoor electrically-connected devices in a room unit using a smartphone or wearable device together with the RFID-to-Bluetooth selective adapter mounted on a RFID door lock of a door of the room unit.

BACKGROUND OF THE INVENTION

In today's door access control systems, there are many places that have adopted RFID doorlocks for improved door access control functions. According to a survey of a physical access control market research, more than 70% of the end-users and 80% of industry respondents believe that in the next 3 to 5 years, hope to use mobile phones, key cards, smart label or alternative devices to replace conventional locks and keys. The survey is further proof that the market will usher in a major smart lock revolution.

However, the conventional smart door locks are typically in the form of RFID doorlocks or Bluetooth activated smart doorlocks. If someone already has a RFID doorlock, it would not be possible to easily upgrade the existing RFID doorlock to that of a Bluetooth smart doorlock. In other words, the existing RFID doorlock has to be completed removed, while replaced by a new Bluetooth smart doorlock installed on the door (for replacing the previous RFID doorlock altogether). Meanwhile, after installation of the new Bluetooth smart doorlock, the previous RFID tags being used as keys for opening the previous RFID doorlock can no longer work on the new Bluetooth smart doorlock, so that the new Bluetooth smart doorlock must be limited to be activated only by Bluetooth capable mobile devices.

In the hospitality industry and for hospitality accommodation establishments, such as hotels, motels, bed and breakfast, resort condos, and Airbnb® lodgings etc, the use of RFID smart door locks and indoor automation and control systems for performing various electrical controls and monitoring are in high demand in recent years, due to the fact that both of the smart door lock and the automation and control system adds to the convenience and enhancement for the overall stay experience of the rented room by the room occupant. For example, a hotel room is typically equipped with power outlets or electrical outlets, HVAC (heating, ventilating, and air conditioning) systems with electrical connections typically operating in one or more electrical circuits, lights that are typically come in two forms, namely, pre-wired lighting fixtures that runs on one or more circuitry with independent power on/off control switches, and independently detachable or moveable lighting fixtures that have electrical plugs plugged into power outlets inside the room for independent power provisioning and on/off control. Other automation and control systems such as for audio/video units, window curtain and blinds opening and closing, security system, dimmer for all lighting, etc can also be incorporated (especially for more luxury or 5-star level of hospitality accommodation establishment). As a result, the room occupant typically finds it to be an enjoyable and delighted experience to be able to conveniently control and automate different room settings and functionalities using just a smartphone.

Therefore, there is a need in providing a more integrated and efficient automation and control solution for the hospitality industry that would be applicable to a rental unit with a RFID door lock installed, and to be able to provide Bluetooth control capability, along with improved overall door access control functionality, and improved convenience and enhancement of the overall stay experience of the room unit by the room occupants.

SUMMARY OF THE INVENTION

The present invention provides an integrated short range and long-range automation and control system for indoor applications using a RFID-to-Bluetooth selective adapter.

The present invention provides the short range to be operating without internet connection, while the long-range to be operating under internet connection. The short-range automation and control can also be called near-range automation and control (without using internet connection), and the long-range automation and control can also be called distant-range or far-range automation and control (requiring to have internet connection).

The present invention provides the RFID-to-Bluetooth selective adapter to include capabilities that allow an administrator to remotely control the RFID door lock, obtain historical data for door entry event logs of guests into an access-controlled space, and to provide automated provisioning and controlling of power on, power off, and electrical power usage history recording functions.

The present invention provides a gateway device that is configured to have internet connection capability, for allowing users to remotely unlock or lock a smart doorlock using the gateway device, send notifications of door unlock events back to a cloud server, and being able to remotely control electrical or electronic devices in a room under short-range (operating mode) or long-range (operating mode).

The present invention provides three detection methods for determining whether any occupant is located or disposed inside a confined space/region, and if not, can automatically or manually power off the electrical power supply/input to the confined space/region.

The present invention provides a current sensor, and through the use of the current sensor installed along the power supply circuit for the confined space/region, the user can measure and assess electric power consumption rate for the confined space in real-time.

The present invention provides further enhancements to the automation and control solution for indoor applications for the hospitality industry thereby adding to the convenience and enhancement of the overall stay experience of a room unit by offering a plurality of online services and offline services that can be implemented and activated upon unlocking or locking of the smartlock which are installed on doors using a smartphone or wireless wearable device equipped with Bluetooth capability.

The present invention also provides further enhancements, benefits, and/or advantages to the automation and control solution for indoor applications in various other usage scenarios, such as for personal homes, public facilities, and commercial office buildings. Because doors are typically main access points to various confined regions, such as a personal home, a library, a hotel room, etc, thus by controlling the locking and unlocking of the smart door lock of the doors, automation and control of online and/or offline services are thereby also achieved. Such online or offline services can be, for example, a parent can know in real-time that a particular child has came back home safely, or that the hotel management or personnel can know whether or not a guest has entered the rented room; upon entry of a main entrance door (equipped with the smart doorlock and the RFID-to-Bluetooth selective adapter) for a condominium complex, the resident through the unlocking of the smart door lock can gain access to the latest up-to-date information broadcast for residents of the condominium complex, or receive notification of monthly condo fee that is due, etc. Upon entering a room, the occupant can conveniently turn on or turn off electrical power to any connected electrical or electronic devices, such as lamps, lights, air conditioning unit, heater, radio, stereo, television, wall outlet, power outlet, etc, as well as enabling capability for viewing of a readily instantly available display control panel on the smartphone that is automated to perform remote control of the powered up or powered off electrical or electronic devices, without having to find each of the corresponding power switches and remote controls for performing the same control step. Upon the occupant entering into the confined space/room via the unlocking of the smart door lock, the power consumption rate data can be collected under the responsibility or assignment of the occupant, so that the administrator or property manager/owner can charge or assess discounts based on actual power consumption amount of that occupant. Upon exiting the room by locking the smart door lock, the APP can query the occupant as to whether or not it is necessary to turn off all remaining powered on electrical or electronic devices inside the room or the confined region, thereby achieving energy savings.

According to an aspect of the present invention, upon entry of a hotel room or a unit for any hospitality accommodation establishments that is installed with an energy saving key card holder, the energy saving key card holder requires a properly authenticated card to be inserted therein so as to allow provisioning of electrical power to the respective connected units. The use of the RFID-to-Bluetooth selective adapter of present invention together with the smartphone, can thereby eliminate the need of inserting of the key card into the energy saving key card holder for allowing continued power on of electrical or electronic devices while the occupant is inside the room.

According to one embodiment of present invention, the conventional energy saving key card holder can then be modified to allow control by a gateway device, and the energy saving key card holder can replaced by a relay controller. Unlike the conventional activating signal which is achieved by an insertion of a properly authenticated key card into the energy saving key card holder, the gateway device of present invention performs the same function in lieu thereof. The gateway device and the relay controller can be coupled together in a wired or wireless manner. For rooms or suite units (comprising of multiple number of rooms) that are difficult to have electrical or cable wiring installed, wireless connection between the gateway device and the relay controller can be an effective solution without excess modification required.

According to one embodiment of the present invention, a relay controller and a current meter can be integrated and installed within one physical module or device. The gateway device, the current meter and the relay controller can all be installed in the energy saving key card holder. Readings from the current meter can be sent to the gateway device, which is then stored in the cloud in a server.

According to one aspect of the present invention, three detection methods are provided for determining whether any occupant is located or disposed inside a confined space or room as follow:

First detection method: the gateway device continuously broadcast beacon signals, and upon not detecting any reply beacon signal from the smartphone of the occupant, then the occupant is assessed as being possibly departing or left the confined region. At this time, the APP can launch a query to the occupant to ask if he/she is still within the confined region, and also whether or not turn off all electrical connections to save power, and if so, transmitting the power off signal to the gateway device via internet connection.

Second detection method: the RFID-to-Bluetooth selective adapter is configured with a g-sensor or a vibration sensor therein for detecting door opening, such as for example, if the door opening motion is detected while the switch on the RFID-to-Bluetooth selective adapter is not being depressed/pressed, then the occupant is reasoned to have been exiting or left the room.

Third detection method: by installing an occupancy sensor as taught in http://en.wikipedia.org/wiki/Occupancy_sensor so as to be detecting occupancy of a space by an occupant thereof, and upon not detecting any reflected signal changes, thereby automatically turning off the electrical devices.

According to another aspect of the present invention, the internet connection capabilities of the gateway device includes the following:

a. One or more of WiFi, 3G/4G, Long Range (LoRa), Ultra Narrow Band (UNB) wireless communication protocols can be adopted for performing and handling the internet connection;

b. if WiFi is already present within the confined region/room, the gateway device can directly be connected to the WiFi and WiFi access points (AP) to achieve internet connection capability;

c. if WiFi is not already present within the confined region, the gateway device can be connected to nearby base station via a 3G/4G baseband transmission module to achieve internet connection capability;

d. because the data transmission rate of the gateway device itself is relatively low, it is more cost effective to utilize LoRa or UNB wireless communication technologies. The LoRa and UNB is a physical transmission layer (100 bps-5k bps) with a low baud rate, and can be transmitted under low power consumption. The transmission distance under line-of-sight condition can reach several kilometers. Just one LoRa or UNB access point needs to be installed or disposed within the confined space for providing space management applications or utilities;

e. when the gateway device is not able to connect to internet, the short-range control and automation functionalities including door opening, power provisioning, power off of electrical outlet can still maintain normal operation, just that the long-range control and automation functionalities would be not be activated or operating.

According to another aspect of the present invention, short range/ near-range (without internet connection) or long-range/distant-range (requiring internet connection) power on/off management and control (including turning power on and turning power off) of electrical or electronic device disposed in the confined region or room or entire house/suite/condo unit (comprising of multiple number of rooms) can be achieved and provided, even in real-time.

According to another aspect of the present invention, users or occupants can use smartphones or wearable devices' Bluetooth wireless communication capability to be connected to the gateway device to issue power on or power off signals to connected electrical devices. As a result, users or occupants can remotely control the power on and power off (power on/off management) using the long-range control method via internet connection, which can be performed wirelessly to transmit the control packet through the WiFi access point to the gateway device, which then issue the control command.

The present invention provides a RFID-to-Bluetooth selective adapter according to an embodiment of present invention for upgrading a conventional RFID doorlock to become capable of operating in two modes simultaneously, namely operating in RFID mode or Bluetooth mode, for allowing entry access by using conventional RFID key tags or Bluetooth equipped smartphones and mobile wearable electronic devices, respectively.

The present invention discloses a RFID-to-Bluetooth selective adapter which functions as a bridge or interface device between a RFID reader equipped device, which can be a RFID door lock, and wireless mobile electronic devices, which can be a smartphone, a tablet device, or a electronic wearable device, operating under Bluetooth or Bluetooth smart capability.

The RFID-to-Bluetooth selective adapter of present invention can allow RFID reader equipped devices/RFID door lock that are capable of only being activated by RFID tags or key cards to be adapted for usage under Bluetooth wireless communication protocol by Bluetooth equipped wireless mobile electronic devices.

The RFID-to-Bluetooth selective adapter of present invention does not negatively affect the original RFID door lock functionalities between the RFID door lock and the conventional RFID tags, but at the same time, allows for the added or extended capability of operating as well under Bluetooth environment.

The RFID-to-Bluetooth selective adapter of present invention can operate under a Bluetooth protocol version called Bluetooth Low Energy (BLE), which is a wireless personal area network technology configured for establishing device-to-device communications that can operating under very low power consumption.

The RFID-to-Bluetooth selective adapter of present invention can be adapted and configured for usage alongside existing or conventional RFID doorlock, for providing Bluetooth capability, so that smartphones and wearable wireless devices can also perform functions similar to that of the RFID tags (RFID transponder) for activating the RFID door lock.

An application of the RFID-to-Bluetooth selective adapter of present invention would be for a RFID doorlock which is used as a part of a smart doorlock system.

Upon installation of the RFID-to-Bluetooth selective adapter on the sensor area of the RFID reader equipped device/ i.e. the RFID doorlock, a smartphone or a wearable device or a tablet device (with BLE or Bluetooth smart capability) can be used to activate or lock/unlock the RFID doorlock.

By using the RFID-to-Bluetooth selective adapter of present invention, the conventional RFID doorlock functionalities can still be maintained, and at the same time, further providing added Bluetooth capability.

As a result, the RFID-to-Bluetooth selective adapter of present invention serves as an upgrade option to the conventional RFID doorlock, while having advantage such as being cost effective and easy to upgrade.

The RFID-to-Bluetooth selective adapter of present invention can be used, for example, in door or area access control situations, such as in private homes, day or monthly rental apartments, hotel rooms, and public space and resource usage management, community mail box, elevators, smart security cabinet, and is not limited to these applications only.

The user can set up and generate a certificate for authentication to the respective authenticated mobile phone upon authentication at a cloud based authentication server, thereby eliminating the need for having to retrieve or obtain any physical RFID key tag.

In embodiments of present invention, an APP configured to provide wireless Bluetooth low energy (BLE) smart door lock remote control operations, and to provide with an user account for the user on the smartphone to register the RFID-to-Bluetooth selective adapter as an authenticated trusted device in a cloud based authentication server.

In embodiments of present invention, the RFID-to-Bluetooth selective adapter can be directly attached or disposed at close proximity to a sensor area of the RFID reader of the smart door lock.

In embodiments of present invention, the APP can be used to set up access rights and permissions for the authenticated RFID-to-Bluetooth selective adapter, the cloud based authentication server can issue a digital certificate to the smartphone to be transmitted to the RFID-to-Bluetooth selective adapter, or the digital certificate can be issued instead through a third party trusted certificate authority. Thus, the APP can be configured to provide wireless access management and control of the RFID reader equipped device using the RFID-to-Bluetooth selective adapter via BLE communications.

A RFID tag or a RFID key card described herein can also be called a RFID transponder.

In embodiments of present invention, a hospitality accommodation establishment includes hotels, inns, service apartments, resort villas, motels, bed and breakfast, and Airbnb® lodgings, but is not limited to just these.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of the embodiments of this invention are presented herein for purpose of illustration and description only. It is not intended to be exhaustive or to be limited to the precise form disclosed.

Figure 1:
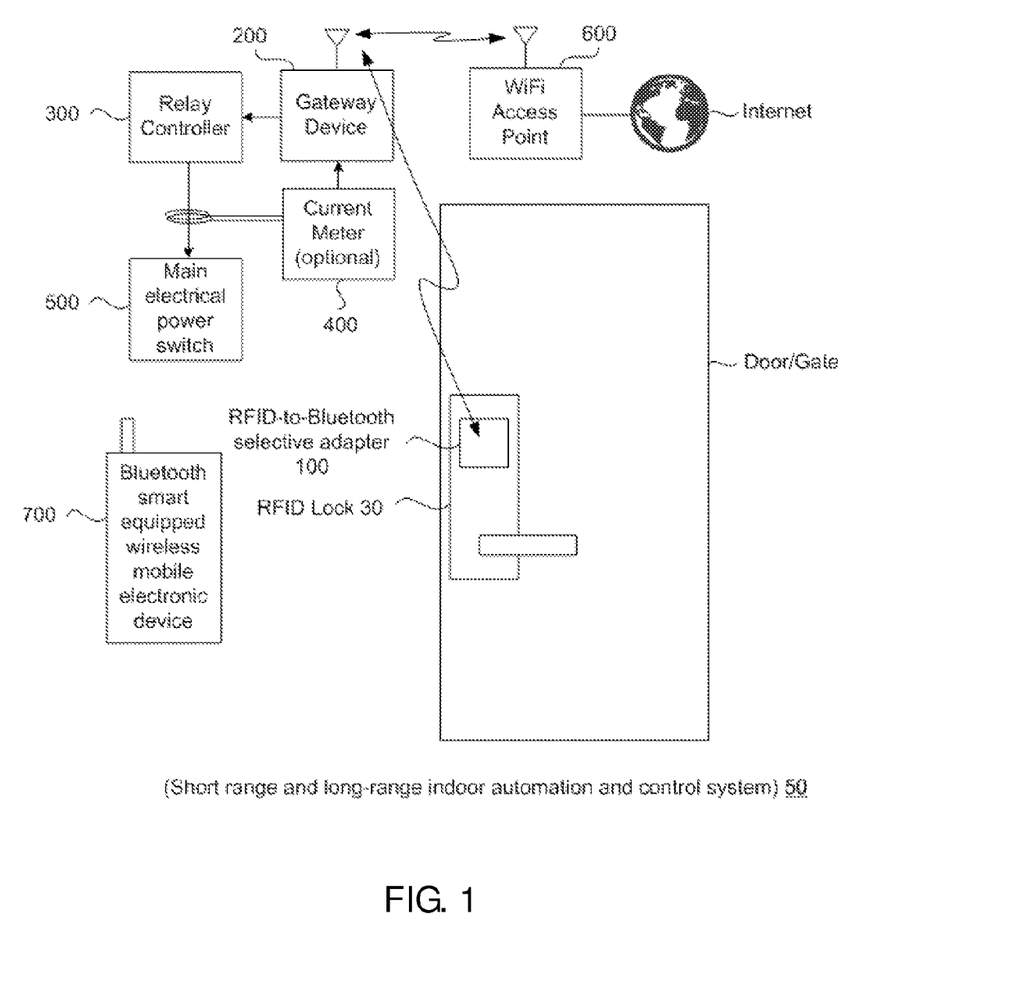
FIG. 1 shows a block diagram of a short range and long-range indoor automation and control system in accordance to a first embodiment of present invention.

As shown in FIG. 1, a short range and long-range indoor automation and control system 50 is provided according to a first embodiment of present invention. The short range and long-range indoor automation and control system 50 includes a Bluetooth smart equipped wireless mobile electronic device 700, such as a smartphone or a wearable electronic device, a RFID-to-Bluetooth selective adapter 100, a RFID Lock 30, a WiFi access point 600 that is connected to the internet, a current meter 400 (optional), a gateway device 200, a relay controller 300, and a main electrical power switch 500. The RFID-to-Bluetooth selective adapter 100 is installed or attached onto the RFID lock 30. The RFID lock 30 has a RFID reader therein, and is mounted onto the door. The RFID-to-Bluetooth selective adapter 100 of the illustrated embodiment can be the RFID-to-Bluetooth selective adapter (10), the RFID lock 30 can be the RFID reader equipped device (17) which are both described in parent application application Ser. No. 14/623,464. The short range automation and control mode operates without internet connection, the long-range mode operating under internet connection. The short-range can also be called near-range (without using internet connection), and the long-range can also be called distant-range or far-range (requiring to have internet connection). The conventional energy saving key card holder (not shown) that are typically found in hotel rooms can be modified to allow control by the gateway device 200, and the energy saving key card holder can be replaced by the relay controller 300. The relay controller 300 can be a programmable relay controller. Unlike the conventional activating signal which is obtained by means of an insertion of a properly authenticated key card into the energy saving key card holder, the gateway device 200 provides the same activating signal through different authentication methods in the first embodiment of present invention. The gateway device 200 and the relay controller 300 can be coupled together in a wired or wireless manner. For rooms that are difficult to have electrical or cable wiring installed, wireless connection between the gateway device 200 and the relay controller 300 can be an effective solution without excess modification required. According to one embodiment of the present invention, a relay controller 300 and a current meter 400 can be integrated and installed within one physical module or unit. In alternative embodiment, the gateway device 200, the current meter 400 and the relay controller 300 can all be installed in an energy saving key card holder (but without actually utilizing the conventional functionality of the energy saving key card holder itself). For instance, the conventional energy saving key card holder requires to have a properly-authenticated RFID card to be inserted therein so as to allow provisioning of power to the respective connected electrical devices. The use of the RFID-to-Bluetooth selective adapter 100 together with the smartphone 700 in the illustrated embodiment, can thereby eliminate the need of inserting of the properly-authenticated RFID key card into the energy saving key card holder for allowing continued power on of electrical or electronic devices while the occupant is inside the room. In the illustrated embodiment, there is no need to place any RFID key card or smartphone on or near the gateway device 200 or the relay controller 300.

Readings from the current meter 400 can be sent to the gateway device 200, which is then stored in the cloud in a server on the internet. In the illustrated embodiment, the internet connection capabilities of the gateway device 200 includes the following: one or more of WiFi, 3G/4G, Long Range (LoRa), Ultra Narrow Band (UNB) wireless communication protocols can be adopted for performing and handling the internet connection; if WiFi is already present within a confined region/space or a room (not shown), the gateway device 200 can directly be connected to the WiFi access points (AP) 600 to achieve internet connection capability; if WiFi is not already present within the confined region, the gateway device 200 can be connected to nearby base station (not shown) via a 3G/4G baseband transmission module (not shown) to achieve internet connection capability; because the data transmission rate of the gateway device 200 itself is relatively low, it is more cost effective to utilize LoRa or UNB wireless communication technologies. The LoRa and UNB is a physical transmission layer (100 bps-5k bps) with a low baud rate, and can be transmitted under low power consumption. The transmission distance under line-of-sight condition can reach several kilometers. Just one LoRa or UNB access point needs to be installed or disposed within the confined space for providing space management applications or utilities; when the gateway device 200 is not able to connect to internet, the short-range functionalities including door opening, power provisioning, power shut off can still maintain normal operation, just that the long-range functionalities would be not be activated or operating. Using the short range and long-range indoor automation and control system 50 of the first embodiment, short range/near-range (without internet connection) or long-range/distant-range (requiring internet connection) power on/off management and control (including turning power on and turning power off) of electrical or electronic device disposed in the confined region or room can be achieved and provided by power on (turn on) or power off (turn off) of a main power switch, even in real-time. In addition, users or occupants can use smartphones or wearable devices' Bluetooth wireless communication capability to be connected to the gateway device 200 to issue power on or power off signals to connected electrical devices. As a result, users or administrator or property manager/owner or occupants can remotely control the power on and power off (power on/off management) using the long-range control method via internet connection, which is performed wirelessly to transmit the control packet through the WiFi access point 600 to the gateway device 200, which then issue the control command.

In the illustrated embodiment for FIG. 1, three detection methods can be provided for determining whether any occupant is located or disposed inside a confined space/room as follow: First detection method: the gateway device continuously broadcast beacon signals, and upon not detecting any reply beacon signal from the smartphone of the occupant, then all occupants are assessed as being possibly departing or left the confined region/room. At this time, the APP can launch a query to one occupant to ask if anyone is still within the confined region/room, and also whether or not turn off all electrical connections to save power, and if so, transmitting the power off signal to the gateway device via internet connection. Second detection method: the RFID-to-Bluetooth selective adapter is configured with a g-sensor or a vibration sensor therein for detecting door opening, such as for example, if the door opening motion is detected while the switch on the RFID-to-Bluetooth selective adapter is not being depressed/pressed, then all occupant is reasoned to have been exited out or left the room. Third detection method: by installing an occupancy sensor as taught in http://en.wikipedia.org/wiki/Occupancy_sensor so as to be detecting occupancy of a space by any occupant thereof, and upon not detecting any reflected signal changes, thereby automatically turning off the electrical devices. One or more of the above detection methods can be used in actual implementation.

Figure 2:
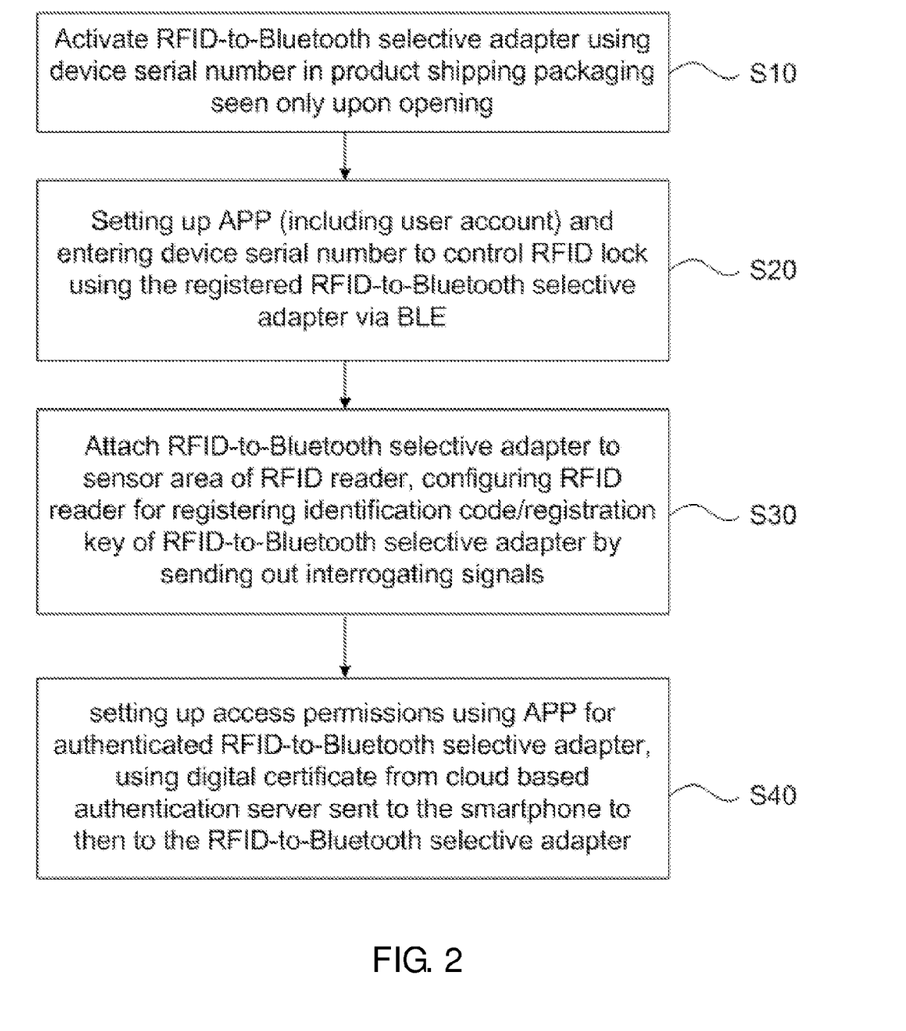
FIG. 2 shows a flow chart of a configuration method for a first time initial configuration of a RFID-to-Bluetooth selective adapter of the first embodiment using an APP.

Referring to FIG. 2, a configuration method of the RFID-to-Bluetooth selective adapter 100 of the first embodiment is described for a first time initial configuration thereof using an APP to include the following steps:

In Step S10, the RFID-to-Bluetooth selective adapter is activated/turned on, to be entering into a setup mode, in which a product shipping packaging of the RFID-to-Bluetooth selective adapter contains a device serial number therein, which can a string of alphanumeric number or a QR code. The device serial number of the RFID-to-Bluetooth selective adapter can only been seen or read upon opening of the shipping packaging to remove the RFID-to-Bluetooth selective adapter, so that when sealed, the packaged RFID-to-Bluetooth selective adapter would not reveal the device serial number to any bystander.

In Step S20, a user can go to an APP store to download an APP that is configured to provide wireless access management and control of the RFID lock using the RFID-to-Bluetooth selective adapter via BLE communications. Upon opening the APP for the first time, an user account is required to be set for the user, and upon successfully setting up the user account on the smartphone, the device serial number is entered to register the RFID-to-Bluetooth selective adapter as an authenticated trusted device in a cloud based authentication server on the internet.

In Step S30, the RFID-to-Bluetooth selective adapter is to be directly attached or disposed at close proximity to the sensor area of the RFID reader of the RFID lock, and to launch or initiate the RFID reader to enter into a configuration mode for adding a new identification code/registration key of the RFID-to-Bluetooth selective adapter. The RFID reader is to read a signal for a identification code/registration key for a customized RFID transponder (not shown) of the RFID-to-Bluetooth selective adapter by sending out an interrogating signal to the RFID transponder (not shown) of the RFID-to-Bluetooth selective adapter so as to perform registering of the identification code/registration key for the RFID-to-Bluetooth selective adapter. The identification code/registration key is a an hexadecimal ID string of 16 bytes In Step S40, the APP is used to set up access rights and permissions for the authenticated RFID-to-Bluetooth selective adapter, the cloud based authentication server can issue a digital certificate which is an encrypted digital file to the smartphone to be transmitted to the RFID-to-Bluetooth selective adapter, or the digital certificate can be issued instead through a third party trusted certificate authority. This digital certificate can be a perpetual certificate or a timed duration certificate.

Figure 3:
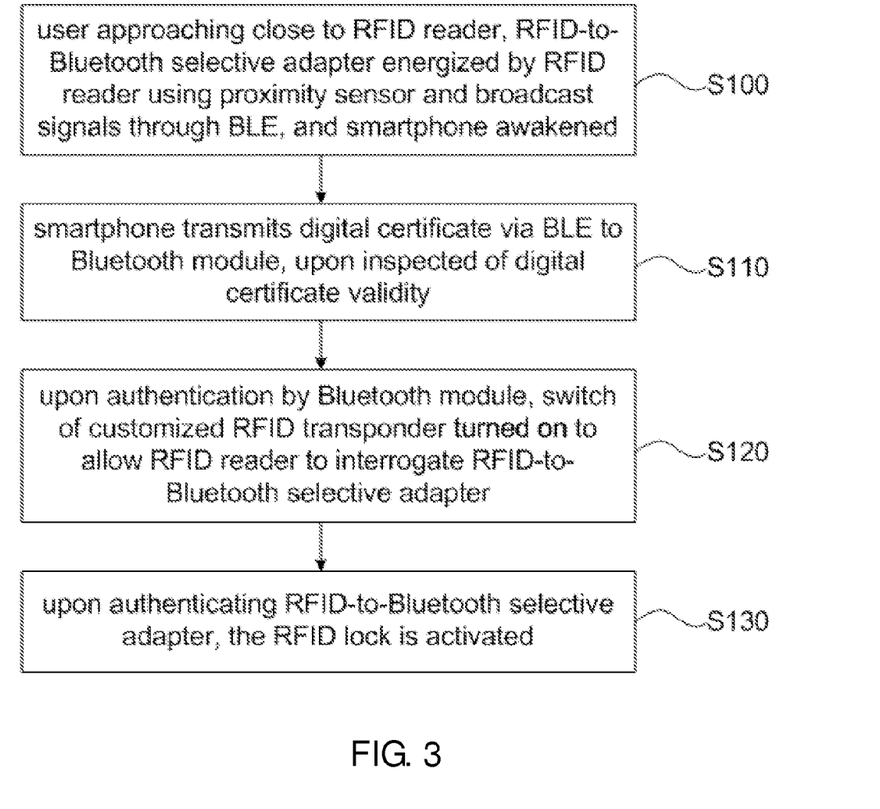
FIG. 3 shows a flow chart of an operating method of the RFID-to-Bluetooth selective adapter of the first embodiment.

Referring to FIG. 3, an operating method of the RFID-to-Bluetooth selective adapter 100 of the first embodiment is described to include the following steps: In Step S100, when the user is approaching close by or at close proximity to the RFID lock, the RFID-to-Bluetooth selective adapter is energized by the interrogating signals from the RFID reader of the RFID lock (the RFID reader has an inductor coil which broadcast the interrogating signals) when the RFID lock, through the use of a proximity sensor, or the like, is able to sense the user located at close proximity thereof, which in turn, will allow the RFID-to-Bluetooth selective adapter to broadcast signals through Bluetooth or BLE, and the smartphone (or any wearable electronic device) in Bluetooth/BLE broadcast coverage range would then intercept the broadcast signal to be automatically awakened and activated.

In Step S110, the smartphone (or the wearable electronic device) transmits the digital certificate to the RFID-to-Bluetooth selective adapter via BLE to a Bluetooth module (not shown) inside therein, the RFID-to-Bluetooth selective adapter is to inspect as to whether the digital certificate is valid or expired or invalid. Without having any authenticated smartphone or wearable mobile device being properly configured by the smart doorlock remote control APP, or in other words, if the user is not using any smartphone or that the smartphone has yet to be installed with the APP, the user can still use a conventional RFID tag or RFID smart card to be placed on or above the sensor area of the RFID lock for performing proper access control usage (i.e. open or close the door, turn on and turn off the door lock).

In Step S120, upon successful authentication by the Bluetooth module, a switch (not shown) of the customized RFID transponder (not shown) inside the RFID-to-Bluetooth selective adapter is turned on by turning on the on/off switch of the customized RFID transponder in the RFID-to-Bluetooth selective adapter, so as allow the RFID reader (of the RFID lock) to interrogate and read the customized RFID transponder (not shown) inside the RFID-to-Bluetooth selective adapter.

In Step S130, upon successfully verifying or authenticating the ID string for the customized RFID transponder of the RFID-to-Bluetooth selective adapter, the RFID lock is activated. For the sake of power conservation, the RFID reader of the RFID lock would not be operating under continuously sensing mode of nearby EMF signals (typically operating under current of dozens of milliamps, mA), only when the RFID reader is placed in close proximity to the user, would then trigger activation of the RFID reader to perform EMF signal sensing by the RFID reader, in this manner, various sensing methods such as by infrared LED, ultrasonic sensing, microwave sensing, which are low-power sensing methods . . . (requiring current in the tens of microamps, uA) can be used. The energy from the EMF signals of the RFID lock can be used to power on the RFID-to-Bluetooth selective adapter, so that Bluetooth or BLE communication from the RFID-to-Bluetooth selective adapter can be established with the adjacent smartphone to perform two way communications using the APP providing wireless access management and control of the RFID lock through the RFID-to-Bluetooth selective adapter downloaded in the smartphone. Under typical operation, the power consumption of the RFID-to-Bluetooth selective adapter is about 5 microamps, or 5 uA.

Figure 4:
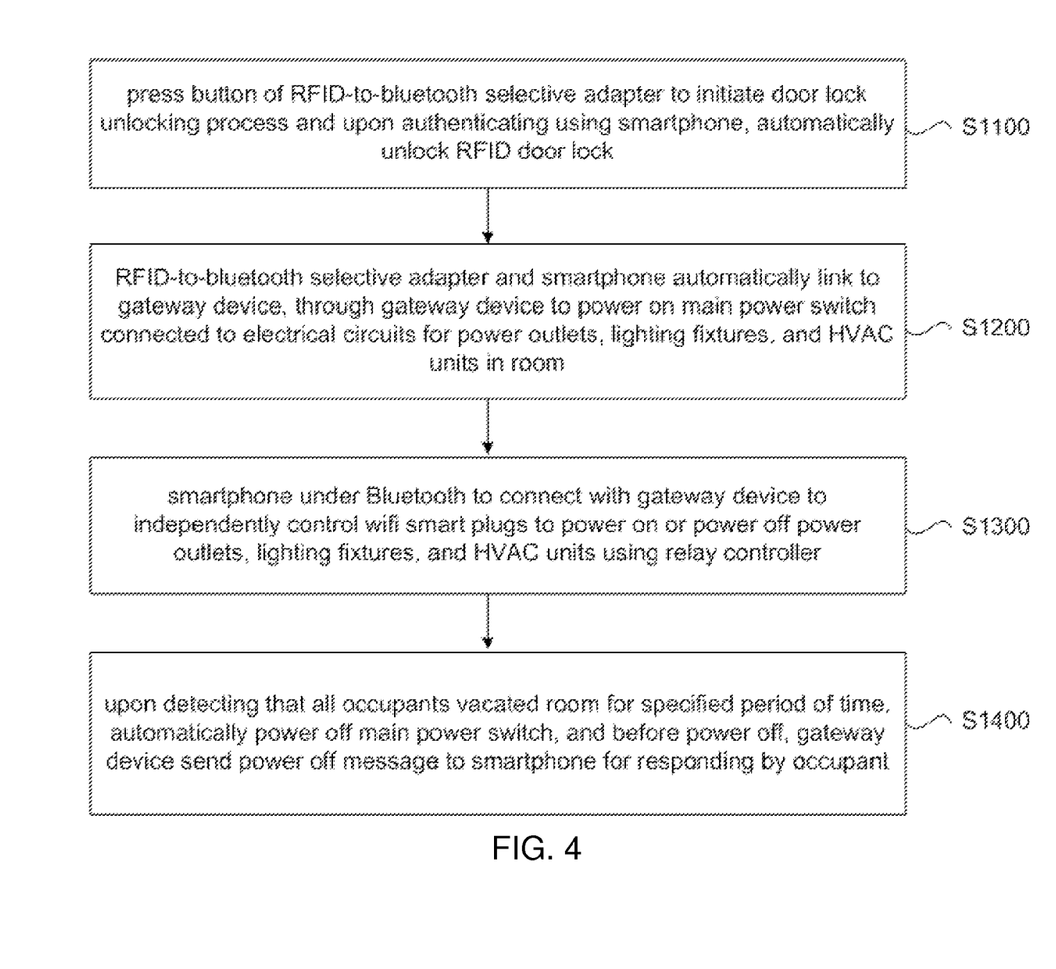
FIG. 4 shows a flow chart of a short-range operating method for the indoor automation and control system of an embodiment of present invention.

Referring to FIG. 4, a flow chart diagram showing a short-range operating method (which requires the download of an APP, and the gateway device not connected to the internet) for indoor automation and control system of an embodiment includes the following steps: In Step S1100, a button of the RFID-to-Bluetooth selective adapter (the RFID-to-Bluetooth selective adapter is disposed or adhered to a sensor area of the RFID door lock) is pressed down to initiate the door lock unlocking process; upon successfully authenticating that the digital certificate is valid using the smartphone or wearable device, the RFID door lock is then automatically unlocked. In Step S1200, the RFID-to-Bluetooth selective adapter, the smartphone or the wearable device automatically link or connect with the gateway device to activate a power supply to electrical and electronic devices that are connect to one or more electrical circuits configured for the confined region/room by turning on / power on a main power switch, in which the main power switch is connected to a plurality of electrical circuits configured for a plurality of power outlets, a plurality of lighting fixtures, and a plurality of HVAC units. In Step S1300, the smartphone can operate under Bluetooth mode to connect with the gateway device to thereby independently control the power supply of the power outlets/electrical outlets, the lighting level or intensity, the air conditioner or heater temperature (HVAC) settings, and the television remote control settings by independently controlling a plurality of WiFi smart plugs to power on or power off the power outlets, the lighting fixtures, and the HVAC units using the relay controller 300. In Step S1400. upon detecting that all occupants to have been vacated or left the room or confined region for a specified period of time (2 minutes to 5 minutes), power outlets or electrical outlets in the room are automatically shut off by power off the main power switch; meanwhile before shutting off or power off, the gateway device will send a power off message to the smartphone, and if the smartphone is still situated or located within the room, the occupant can respond by acknowledging that power is still needed to be turned on, thus avoiding premature or accidental power shut off.

Figure 5:
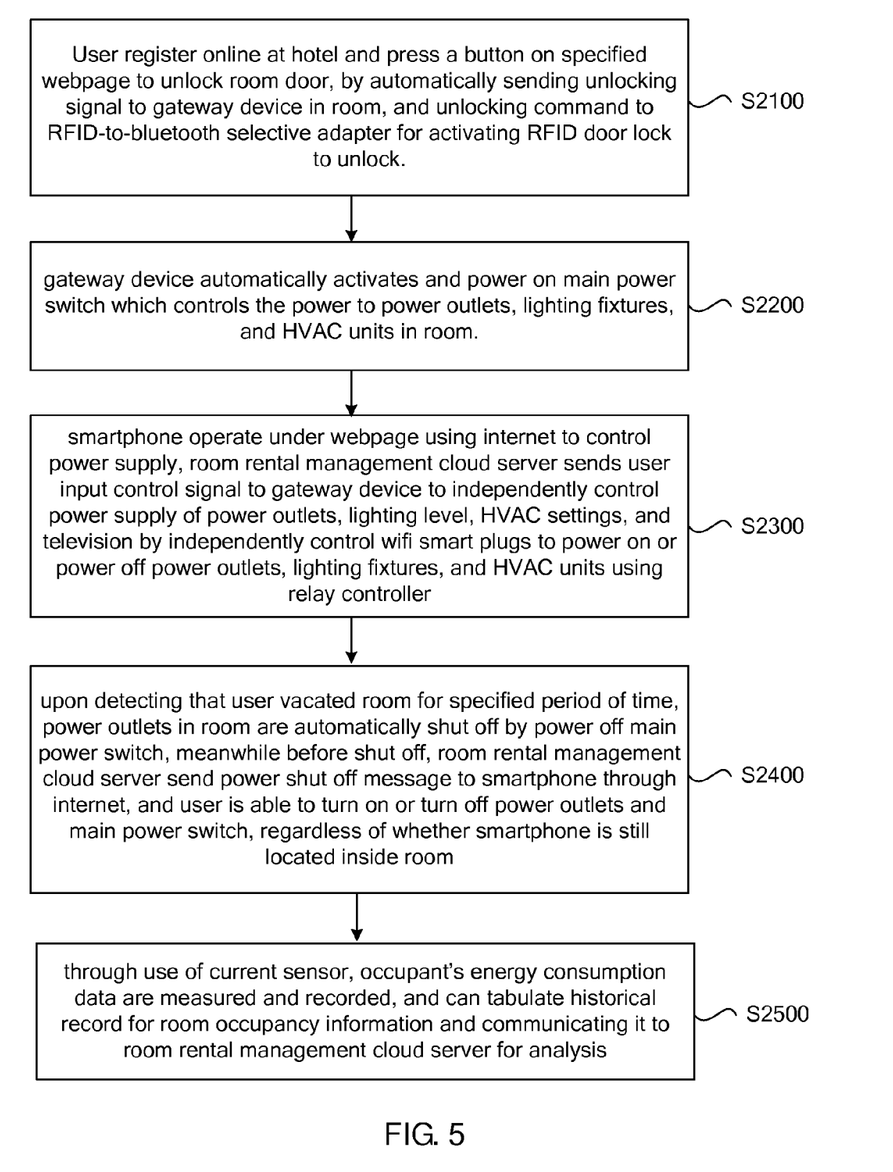
FIG. 5 shows a flow chart of a long-range operating method for the indoor automation and control system of an embodiment of present invention.

Referring to FIG. 5, a flow chart diagram showing a long-range operating method (can be browser controller, thus does not requires the download of an APP, and the gateway device is required to be connected to the internet) for a hospitality accommodation establishment automation and control system includes the following steps: In Step S2100, a user can register online at the hotel (or any other hospitality accommodation establishment), and press a button on a specified webpage (the specified webpage is a secure webpage particular designed for the hotel guest to sign-on/sign-in during check-in or check-out) to unlock the room door of a rented room by the user. The room rental management cloud server then automatically sends the door lock unlocking signal to the gateway device in the rented room, the gateway device then automatically sends an unlocking command to the RFID-to-Bluetooth selective adapter for activating the RFID door lock to unlock. In Step S2200, the gateway device automatically activates and power on a main power switch which controls the power supply to the power outlets/electrical outlets, lighting fixtures, and HVAC units in the room. In Step S2300, the smartphone can operate under the specified webpage (the specified webpage is a secure webpage also particular designed for the hotel guest to perform various remote control commands during his or her stay in the room) using internet to control the power supply of the power outlets, the room rental management cloud server then sends one or more user input control signal to the gateway device in the rented room in real time to connect with the gateway device to thereby independently control the power supply of the power outlets, the lighting level or intensity, the air conditioner or heater temperature (HVAC) settings, and the television remote control settings by independently controlling a plurality of WiFi smart plugs to power on or power off the power outlets, the lighting fixtures, and the HVAC units using the relay controller 300. In Step S2400, upon detecting that the user to have been vacated or left the room for a specified period of time (2 minutes to 5 minutes), the power outlets in the room are automatically shut off by power off the main power switch, meanwhile before shut off, the room rental management cloud server will send the power shut off message to the smartphone through the internet connection, and the user is able to turn on or turn off the power outlets and the main power switch, regardless of whether the smartphone is still located inside the room or not. In Step S2500, through the use of the current sensor, the occupant's electricity and energy consumption data can be measured and recorded, and can tabulate also historical record for room occupancy information, i.e. percent and duration of occupant staying inside the room versus outside the room, and communicating the historical record for room occupancy information to the room rental management cloud server for analysis and other usages.

One advantage of the embodiments of present invention include the ability to perform the short-range operating method of FIG. 4 and the long-range operating method of FIG. 5 in one of the following operating scenarios: (a) switching between short-range or long-range automatically based on internet availability or user preference; (b) switching between short-range or long-range manually by an administrator override command by a property owner or manager, when for example, an emergency situation is suspected of occurring at the confined location/space, and the property owner needs to shut-off the power from a distant remote location; (c) switching between short-range or long-range manually by an occupant, due to personal preference or signal quality issues.

Another advantage of the embodiments of present invention include the seamless integration of the smart door access control system together with indoor automation and control system into one convenient system for the enclosed space.

Another advantage of the embodiments of present invention include the automatic power on and power off of various connected electrical and electronic devices in the confined space upon entering and exiting the room through the door with the RFID lock, respectively, using the RFID-to-Bluetooth selective adapter and the smartphone/wearable device operating under Bluetooth upon secure authentication.

The RFID-to-Bluetooth selective adapter 100 of the first embodiment has reduced barrier to adoption due to the ease and convenience of being easily adapted to existing RFID doorlock systems, and requiring only limited expenditure to cover purchase cost, installation cost and labor. In addition, there is no need to discard the existing RFID doorlock system. Moreover, the physical size of the RFID-to-Bluetooth selective adapter is relatively small in comparison with some of the available Bluetooth smart lock on the market. Thus, the usage of the RFID-to-Bluetooth selective adapter allows typical home owner or property owner/manager to provision electronic keys securely by internet to any designated or chosen individual(s) under various different access control duration or schemes (i.e. the electronic key can allow for access for just one entry, for multiple entry within one day or specified days, for one month, etc.) so that the hassle of exchanging physical RFID keys are thereby avoided.

The RFID-to-Bluetooth selective adapter 100 through the usage of an APP configured in the smartphone/BLE equipped device 700 and a cloud based authentication server (not shown) can thereby provide various different access rights and settings for various users using the RFID smart door lock 30.

In the above embodiments, the APP is configured to provide wireless access management and control of the RFID lock 30 using the RFID-to-Bluetooth selective adapter 100 via BLE communications, and to provide with an user account for the user on the smartphone to register the RFID-to-Bluetooth selective adapter as an authenticated trusted device in a cloud based authentication server. In addition, the APP is used to set up access permissions for the authenticated RFID-to-Bluetooth selective adapter, and transferring the digital certificate issued from the cloud based authentication server to the RFID-to-Bluetooth selective adapter. The user can use the APP to activate or deactivate the RFID reader equipped device using the RFID-to-Bluetooth selective adapter in real-time conveniently with or without internet connection. In a RFID doorlock usage scenario, the user can use the APP to open or close a door with a RFID smart doorlock mounted with a RFID-to-Bluetooth selective adapter in real-time conveniently with or without internet connection.

In the above embodiments, the compatible Bluetooth versions that can be used include Bluetooth, Bluetooth smart, Bluetooth smart ready, and/or other Bluetooth versions also included.

In the above embodiments, the terms "activated" and "activating" can have at least one of the following meanings: (a) for an entity to go from an "on" state to an "off" state when it is currently in an "off" state; or (b) for an entity to go from an "off" state to an "on" state when it is currently in an "on" state; (c) for a circuit to go from a closed circuit to an open circuit when it is currently in closed circuit state; or (d) for a circuit to go from a open circuit to an closed circuit when it is currently in open circuit state. Entity can be any of the component elements of the RFID-to-Bluetooth selective adapter. Circuit can be a circuit of one entity. The terms "activating" and "activate" are different from the terms "initiating" and "initiate", because "activating" and "activate" implies that the entity subsequently may continue on to perform authorized actions, whereas, "initiating" and "initiate" merely implies that the entity has being powered on, without being given any authentication or permissions for performing further actions. Confined region/space, room, and suite can be adapted to include various indoor, semi-indoor, or even outdoor spaces as well, and thus is not limited to the scope thereof. For example, a secure fence erected around the entire peripheral perimeter can also serve as sufficient boundary for defining an outdoor confined region.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A short-range operating method for an indoor automation and control system, comprising the steps of:

pressing a button of a RFID-to-Bluetooth selective adapter to initiate an unlocking process for a RFID door lock;

upon successfully authenticating that a digital certificate is valid using a smartphone or a wearable device, automatically unlocking the RFID door lock;

automatically connecting the RFID-to-Bluetooth selective adapter, the smartphone or the wearable device to a gateway device, the gateway device activates a main power switch to turn on, the main power switch being connected, to a plurality of electrical circuits configured for a plurality of power outlets, a plurality of lighting fixtures, and a plurality of HVAC units;

operating the smartphone under Bluetooth to connect with the gateway device, thereby independently controlling a plurality of wifi smart plugs to power on or power off the power outlets, the lighting fixtures, and the HVAC units; and upon detecting that all occupants have vacated a confined region for a specified period of time, and before powering off the main power switch, sending a power off message from the gateway device to the smartphone for verification, and upon verification, automatically powering off the main switch.

2. The short-range operating method as claimed in claim 1, wherein an application is downloaded and installed on the smartphone or the wearable device before performing the short-range operating method, and wherein the gateway device is not connected to the Internet during each of the steps.

3. The short-range operating method as claimed in claim 2, wherein the RFID-to-Bluetooth selective adapter comprising a customized RFID transponder, the smartphone or the wearable device communicating through Bluetooth, performs authentication and management of the RFID-to-Bluetooth selective adapter for activating the customized RFID transponder therein to allow the RFID door lock to read a signal from the customized RFID transponder.

4. The short-range operating method as claimed in claim 1, wherein a plurality of detection methods are provided for determining whether any occupant is located, or disposed of, inside the confined region.

5. The short-range operating method as claimed in claim 1, wherein the short-range operating method being is being capable of performed alongside a long-range operating method for a hospitality accommodation automation and control system by switching between the long-range operating method and the short-range operating method automatically based on Internet availability or user preference, or switching between the long-range operating method and the short-range operating method manually by an administrator override command by a property owner, manager, or an occupant.

6. The short-range operating method as claimed in claim 2, wherein the controlling of the wifi smart plugs, the lighting fixtures, and the HVAC units is performed independently using a relay controller.

7. The short-range operating method as claimed in claim 6, wherein a door access control system and the indoor automation and control system are combined together into one integrated system, thereby sharing authentication information of an occupant, the application, the relay controller, the gateway device, and power on and power off signals.

8. A long-range operating method for a hospitality accommodation automation and control system, the comprising steps of:

registering a user online at a hospitality accommodation establishment by pressing a button on a specified webpage to unlock a room door of a rented room;

upon successfully registering a user, automatically sending a door unlocking signal of the rented room to a gateway device from a room rental management cloud server, automatically sending an unlocking command to a RFID-to-Bluetooth selective adapter from the gateway device for activating a RFID door lock to unlock;

automatically activating a main power switch to turn on by the gateway device, the main power switch being connected to a plurality of electrical circuits configured for a plurality of power outlets, a plurality of lighting fixtures, and a plurality of HVAC units;

operating a smartphone under a specified webpage using the Internet by having the room rental management cloud server send one or more user input control signals to the gateway device in the rented room in real time to connect with the gateway device to thereby independently control a plurality of WiFi smart plugs to power on or power off the power outlets, the lighting fixtures, and the HVAC units;

before powering off the main power switch, the room rental management cloud server sends the power off message to the smartphone through an Internet connection, and the user is able to power on or power off the main power switch regardless of whether the smartphone is still located inside the room or not; upon detecting that the user has vacated the room for a specified period of time, automatically powering off the main power switch; and measuring and recording an occupant's electricity and energy consumption data using a current sensor, and tabulating historical records for room occupancy information and communicating the historical records for room occupancy information to the room rental management cloud server for analysis;

wherein the gateway device is connected to the Internet, and the smartphone or a seventh wearable device communicating through Bluetooth, activates the RFID-to-Bluetooth selective adapter to allow the RFID door lock to read a signal from a RFID-to-Bluetooth selective adapter.

9. The long-range operating method as claimed in claim 8, wherein the long-range operating method is capable of being performed alongside a short-range operating method for an indoor automation and control system by switching between the long-range operating method and the short-range operating method automatically based on an Internet availability or user preference, or switching between the methods manually by an administrator override command issued by a property owner, manager, or a user.

10. The long-range operating method as claimed in claim 8, wherein a door access control system and the hospitality accommodation automation and control system are combined together into one integrated system.

11. The long-range operating method as claimed in claim 8, wherein the controlling of the wifi smart plugs, the lighting fixtures, and the HVAC units is performed independently using a relay controller.

12. A configuration method of a RFID-to-Bluetooth selective adapter using an application, the comprising steps of:

activating the RFID-to-Bluetooth selective adapter to enter into a setup mode, and entering a device serial number from a product shipping packaging of the RFID-to-Bluetooth selective adapter, wherein the device serial number is only readable upon opening of the packaging to remove the RFID-to-Bluetooth selective adapter;

configuring an application to manage and control the RFID reader equipped device using the RFID-to-Bluetooth selective adapter via Bluetooth low energy, entering the device serial number in the APP to register the RFID-to-Bluetooth selective adapter in a cloud based authentication server;

attaching the RFID-to-Bluetooth selective adapter to the sensor area of an RFID reader and initiating the RFID reader to add an identification code or a registration key of the RFID-to-Bluetooth selective adapter;

performing registering of the identification code or the registration key for the RFID-to-Bluetooth selective adapter by the RFID reader by sending out an interrogating signal to the RFID-to-Bluetooth selective adapter; and setting up access rights for the RFID-to-Bluetooth selective adapter using the application, and issuing a digital certificate from the cloud based authentication server to the RFID-to-Bluetooth selective adapter.

\* \* \* \* \*